July 11, 1939.  W. R. KOCH  2,165,800

DIRECTION CONTROL DEVICE

Filed June 22, 1937  3 Sheets—Sheet 1

Inventor
Winfield R. Koch
By
Attorney

July 11, 1939.  W. R. KOCH  2,165,800
DIRECTION CONTROL DEVICE
Filed June 22, 1937   3 Sheets-Sheet 3

Inventor
Winfield R. Koch
By
Attorney

Patented July 11, 1939

2,165,800

UNITED STATES PATENT OFFICE 2,165,800

DIRECTION CONTROL DEVICE

Winfield R. Koch, Merchantville, N. J., assignor to Radio Corporation of America, a corporation of Delaware Application June 22, 1937, Serial No. 149,622

7 Claims. (Cl. 250—2)

This invention relates to direction control devices which are useful in controlling the path followed by moving objects such as aerial bombs, vehicles or the like, and has for its principal object the provision of an improved apparatus and method of operation whereby a modulated carrier wave of very high frequency may be utilized to determine the orientation of the object and the direction of its motion.

More particularly, the invention contemplates the use of a micro-wave carrier which is modulated by one pair of impulses differing in frequency for maintaining a predetermined orientation of the moving object and by other pairs of impulses differing in frequency for steering the object in directions at right angles to one another. Thus one pair of such differing frequency waves may be utilized to maintain automatically a predetermined orientation of the device, another pair controlled manually may be utilized to steer it east and west and another pair controlled manually may be utilized to steer it north and south, all the waves of the three pairs being of different frequency and therefore readily segregated in the different control circuits of the apparatus. As illustrated in the exemplified embodiment of the invention, the different control waves may be of audio or other relatively low frequency. Due to the fact that a predetermined orientation or rotational position of the object is automatically maintained, the field patterns of the different control waves at the receiving antenna are such as to ensure continuous control of the object throughout its path.

The invention will be better understood from the following description when considered in connection with the accompanying drawings and its scope is indicated by the appended claims.

Referring to the drawings—

Figure 1:
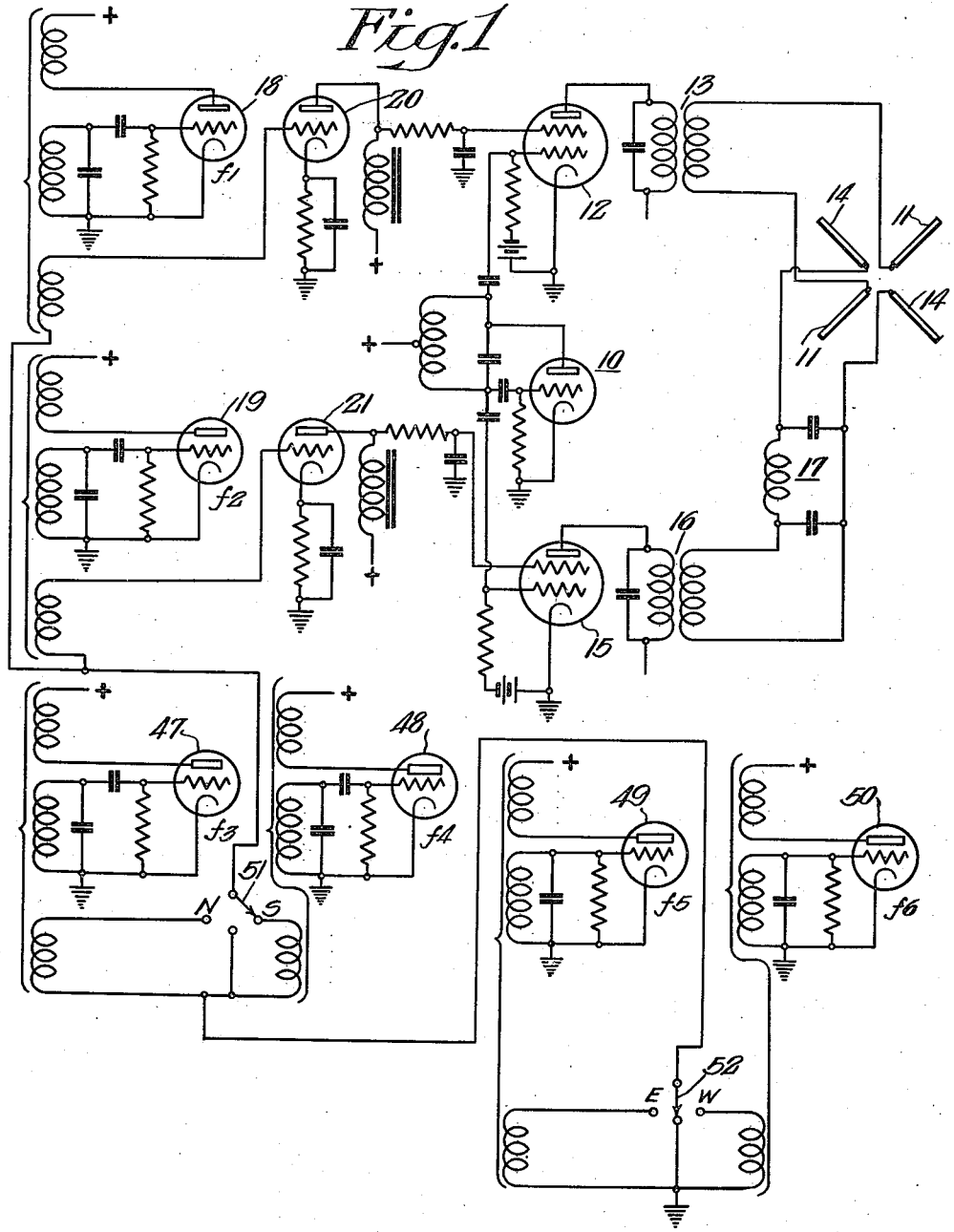
Fig. 1 is a wiring diagram of a transmitter.

The transmitter of Fig. 1 includes a micro-wave or high frequency oscillation generator 10 provided (1) with one output circuit which is connected to an antenna 11 through a radio frequency amplifier 12 and a coupling transformer 13 and (2) with another output circuit which is connected to an antenna 14 through a radio frequency amplifier 15, a coupling transformer 16 and a phase control network 17. Since the antennas 11 and 14 are at right angles to one another and are supplied with carrier waves having a phase difference of ninety degrees but modulated to the same degree by different modulating frequencies, the resulting fields will produce currents of equal value of the modulating frequencies in the receiver when the receiving antenna is properly oriented.

Such orientation of the moving object and its receiving antenna is automatically maintained with respect to that of the transmitting antennas by means of oscillation generators 18 and 19 which are coupled respectively through a modulator 20 to the amplifier 12 thus modulating the carrier supplied to the antenna 11, and through a modulator 21 to the amplifier 15, thus modulating the carrier supplied to the antenna 14. In order to follow through the various steps by which this result is achieved, it is necessary now to refer to Figs. 2, 3 and 4.

Figure 2:
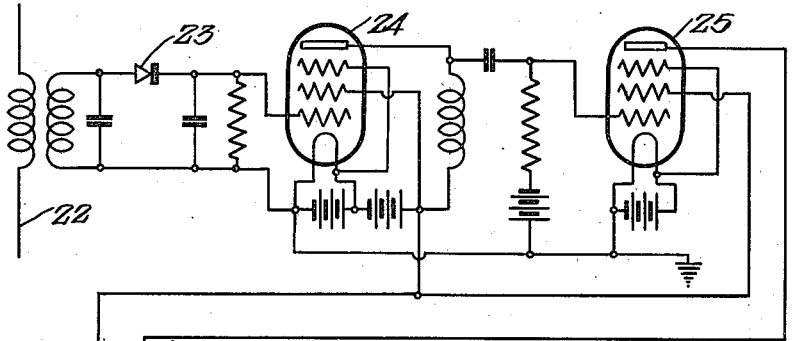
Fig. 2 is a similar diagram of a receiver.
Figure 2:
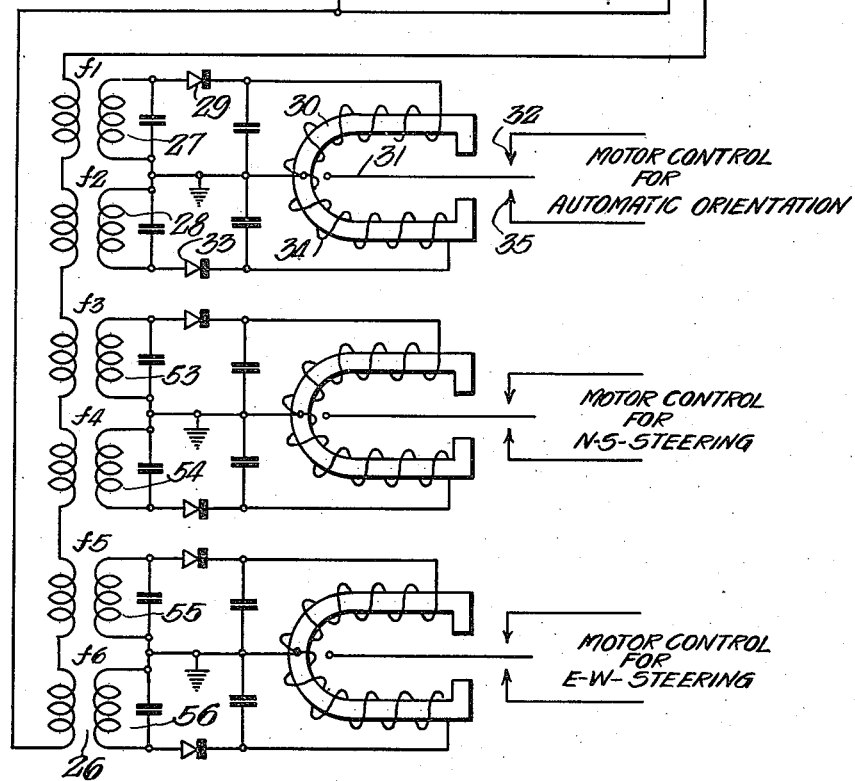

As indicated by Fig. 2, there is mounted on the moving object an antenna 22 which is coupled through a rectifier 23 and amplifiers 24 and 25 to a transformer 26 provided with a plurality of secondary circuits each tuned to a different one of the various control waves. Thus, the secondary circuits 27 and 28 are tuned respectively to the waves generated by the oscillation generators 18 and 19 of Fig. 1. From the tuned control circuit 27, current is supplied through a detector or rectifier 29 to a winding 30 which tends to move a switch member 31 into engagement with a contact member 32. From the tuned circuit 28, current is likewise supplied through a rectifier 33 to a winding 34 which tends to move the contact member 31 in the opposite direction into engagement with a contact 35.

Figure 3:
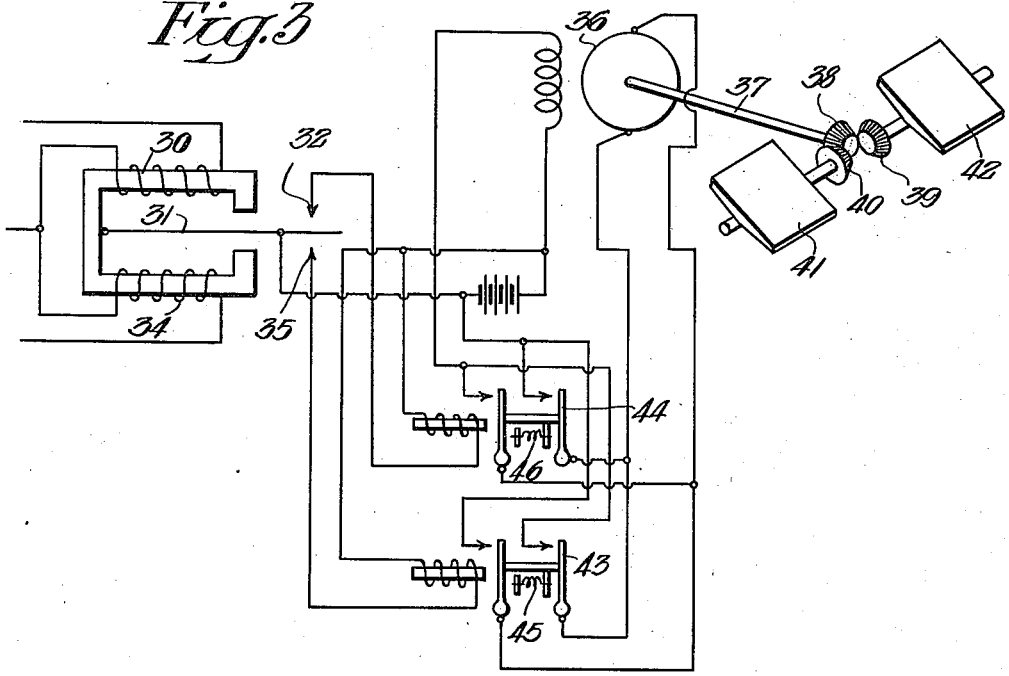
Fig. 3 illustrates the control circuits of one of the steering motors.
Figure 4:
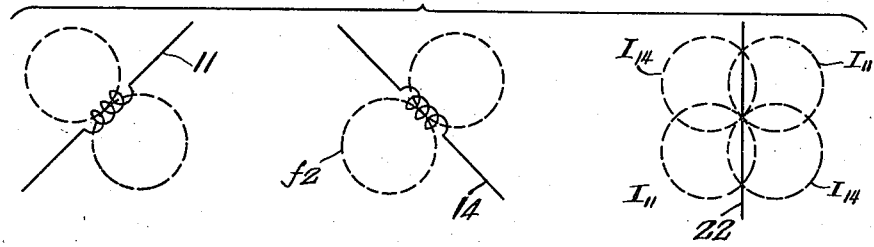
Fig. 4 illustrates the field pattern of one pair of control waves at the receiver antenna.

As indicated by Fig. 3, the double throw switch 31—32—35 is arranged to control operation of a motor 36 which operates through a shaft 37 and gears 38, 39 and 40 to rotate the orientation rudders 41 and 42 in opposite directions so as to maintain automatically a predetermined angular relation between the receiver antenna 22 and the transmitter antennas 11—14.

How this desired relation between the transmitter and receiver antennas is maintained will be readily understood if it be considered that the amplitude of the current induced in a receiving antenna by a transmitting antenna is the greatest when the two antennas are parallel. In the present instance the crossed dipole transmitting antennas are mounted in a horizontal plane and the receiving dipole is affixed to the bomb so that it will assume a horizontal position when the bomb is falling. Consequently the amplitude of the current induced in the receiving antenna by each transmitting dipole depends upon the orientation of the bomb with respect to the transmitting antennas. The amplitude of the current induced from each transmitting antenna, plotted against the angular rotation of the receiving antenna, is indicated by the dotted lines of Fig. 4. Thus with the antenna 22 in its illustrated posititon, the transmitting antennas 11 and 14 produce equal currents in the antenna 22 and in the windings 30 and 34 and the contact member 31 remains in its illustrated position. If the antenna 22 tends to rotate in a counter clockwise direction, however, the current induced by antenna 14, indicated by the curves $I_{14}$, predominates and as a result the member 31 engages the contact 35 thus effecting closure of the switch 43 and slightly rotating the orientation control rudders 41 and 42 so s to bring the antenna 22 back into the desired relation with the antennas 11 and 14. Likewise, if the antenna 22 tends to rotate in a clockwise direction, the current induced by the antenna 11, indicated by the curves $I_{11}$, predominates and the member 31 is moved into engagement with the contact 32 thus effecting closure of the switch 44 and causing the antenna 22 to be rotated back into the desired relation with the antennas 11 and 14. It will be observed that the switches 43 and 44 are biased to their open positions by means of springs 45 and 46 so that the motor 36 is deenergized when the angle of the receiving antenna is properly related to the antennas 11 and 14. Any suitable damping mechanism may, of course, be provided to prevent over-running of the motor.

It will be apparent that when the transmitting antennas are located near each other, as shown in Fig. 1, the receiving antenna is substantially equidistant from both transmitting antennas at all times. Consequently the relative amplitude of the currents which correspond respectively to the differently modulated carriers from the two antennas is not a function of the position of the receiving antenna in space, but only a function of the orientation of the receiving antenna with the transmitting antennas. Any desired angular relation may thus be maintained between transmitting and receiving antennas located on moving objects or between antennas which are located respectively on still and moving objects. This result has utility in many cases such as where the path of a bomb is to be controlled from any aeroplane, where a fleet of aeroplanes are to be controlled from a single point and the like. In such cases, a number of moving objects are readily steered from a single or a number of control points so long as the receiver and transmitter antennas are properly oriented with respect to one another.

In the exemplified embodiment of the invention, the controlled moving object is illustrated as an aerial bomb (Fig. 5) which, in addition to the orientation control rudders 41 and 42, is also provided with two pairs of steering rudders 63—64 and 65—66. These two pairs of rudders are mounted on rotatable shafts which are located at right angles to one another and have their rotation manually controlled through means similar in most respects to the means provided for automatic control of the orientation rudders 41—42.

In order to understand how steering of the object is effected, it is necessary to refer again to the transmitter circuit of Fig. 1. This figure includes a number of braces which are placed adjacent different coil groups for indicating that the coils in each group are coupled together.

It will be observed that the modulators 20 and 21 are arranged to have their control grids connected to any one of a plurality of oscillation generators 47, 48, 49 and 50 by means of triple throw switches 51 and 52, each of which in its center position completes the ground connection of the oscillator output circuit. The switches 51 and 52 are manually operated to equally modulate the carrier currents in both antennas 11 and 14 and thus to establish at the transmitter and receiver antennas fields which are equally modulated by the frequency required to steer the moving object in a given direction. Thus the switch 51 may be utilized to control operation of the rudders 63—64 for steering in a north-south direction and the switch 52 may be similarly utilized to control operation of the rudders 65—66 for steering in an east-west direction.

The circuits by which steering is controlled are shown in Fig. 2 wherein the secondary circuits 53, 54, 55 and 56 are tuned respectively to the frequencies generated by the oscillators 47, 48, 49 and 50.

Figure 6:
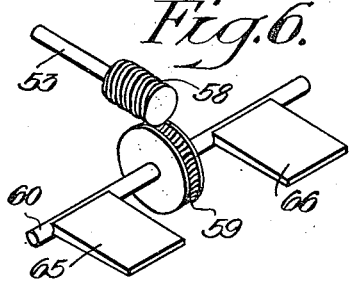
Fig. 6 illustrates a detail of the steering mechanism.

These circuits are associated with control apparatus which is similar in most respects with that described in connection with the secondary circuits 27 and 28 and which will therefore be readily understood without detailed explanation. As indicated by Fig. 6, the gearing of the motor shaft to the steering rudders is somewhat different from that of the orientation rudders 41 and 42 (Fig. 3). Thus each pair of steering rudders 65—66 and 63—64 is coupled through a worm and gear 58—59 directly to the rudder shaft 60 which turns the rudders 65 and 66, for example, to and fro together instead of in opposite directions as in the case of the orientation rudders.

Figure 5:
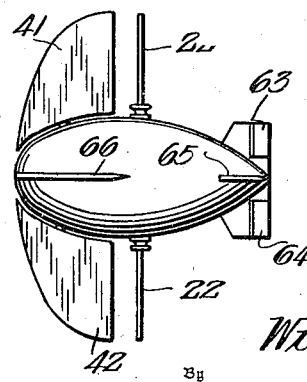
Fig. 5 is a perspective view of one type of object which may have the direction of its motion controlled by the transmitter and receiver of the previous figures.

It is thus apparent that the steering rudders 63—64 and 65—66 are selectively controlled by manipulation of the switches 51 and 52 while the orientation rudders are automatically controlled by the relative intensity of the current received from the two differentially modulated antennas to maintain a predetermined relation between the transmitter and receiver antennas so that the steering control waves are properly received. In order to protect the object from interference generated at a point approached by the object, the antenna 22 may be placed so as to be shielded by rudders 41—42 (Fig. 5).

I claim as my invention:

1. In a system for controlling the path of a moving object, the combination of a transmitter located at the control point and provided with a pair of crossed horizontal dipole antennas arranged to produce a pair of fields angularly displaced with respect to one another, means for modulating one of said pair of fields at a first modulating frequency, means for equally modulating the other of said pair of fields at a second modulating frequency, means including a first selector switch for simultaneously modulating both of said fields at either a third or a fourth modulating frequency, and means including a second selector switch for simultaneously modulating both of said fields at either a fifth or a sixth modulating frequency, a receiver antenna located on said object, means automatically responsive to the relative intensity of rectified currents corresponding to said first and second modulating frequencies for maintaining a given orientation between said receiving antenna and said transmitting antenna, means responsive to currents corresponding to said third and fourth modulating frequencies for respectively raising and lowering a first pair of steering fins, and means responsive to currents corresponding to said fifth and sixth modulating frequencies for respectively raising and lowering a second pair of steering fins at right angles to said first pair, whereby said object is automatically prevented from rotating about its axis, and its direction is controllable by means of the selection of the proper modulating frequencies by said selector switches.

2. In a system for controlling the path of a falling object, the combination of a transmitter located at a control point and a receiver located on said object, said transmitter including a pair of antennas for radiating a pair of radio frequency fields, means for differentially modulating said fields, and said receiver including an antenna, means responsive to the relative amplitude of currents respectively induced in said antenna by each of said pair of antennas, and means operably connected to said responsive means for maintaining a predetermined orientation of said receiving and radiating antennas.

3. In a system for controlling the path of an object, the combination of a transmitter located at a control point and a receiver located on said object, said transmitter including a pair of antennas arranged to radiate a pair of angularly related fields, and said receiver including a receiving antenna, means responsive to changes in the orientation of said receiving antenna with respect to said transmitting antennas for maintaining a predetermined orientation between said transmitting and receiving antennas, and means responsive to changes at said transmitter for controlling the path of said object.

4. In a system for controlling the path of a moving object, a transmitter located at a control point and a receiver located on said object, said transmitter including a pair of crossed antennas for radiating a pair of radio frequency fields, means for producing modulations in one of said fields at a first modulating frequency, means for producing modulations in the other of said fields at a second modulating frequency, means for producing simultaneous modulations in both of said fields at a desired one of a plurality of other modulating frequencies, and said receiver including a receiving antenna in which the relative amplitude of currents induced therein by said fields is a function of the angular relation of said antenna with said crossed antennas, a pair of differentially connected rudders responsive to the relative amplitude of said induced currents for maintaining the orientation of said antenna with respect to said crossed antennas, and means selectively responsive to said other modulation frequencies for controlling the course of said object.

5. In a system for controlling the flight of a falling object, a transmitter located at a control point and a receiver located on said object, said transmitter including a pair of crossed horizontal dipole antennas for radiating a pair of radio frequency fields, means for producing modulations in one of said fields at a first modulating frequency, means for producing modulations in the other of said fields at a second modulating frequency, and means for simultaneously producing modulations in both of said fields at a desired one of a plurality of other modulating frequencies, and said receiver including a horizontally positioned dipole antenna mounted on said object and coupled to said receiver, means for rectifying currents induced in said antenna to obtain modulation frequency currents, frequency selective means for separating said modulation frequency currents into separate channels, means responsive to the relative amplitudes of said selected currents corresponding to said first and second modulating frequencies for maintaining the orientation of said dipole antenna and said radiating antennas, and means respectively responsive to selected currents corresponding to said other modulating frequencies for steering said object in a vertical plane and in a vertical plane normal thereto.

6. In a system for controlling the flight of a falling object, a transmitter located at a control point and a receiver located on said object, said transmitter including a pair of crossed horizontal dipole antennas for radiating a pair of radio frequency fields, means for producing modulations in one of said fields at a first modulating frequency, means for producing modulations in the other of said fields at a second modulating frequency, and means for simultaneously producing modulations in both of said fields at a desired one of a plurality of other modulating frequencies, and said receiver including a horizontally positioned dipole antenna mounted on said object and coupled to said receiver, means for rectifying currents induced in said antenna to obtain modulation frequency currents, frequency selective means for separating said modulation frequency currents into separate channels, a pair of differentially connected rudders, means for operating said rudders in response to changes in the relative amplitudes of said selected currents corresponding to said first and second modulating frequencies, said rudders causing said object to rotate in a direction to oppose said change, and means respectively responsive to selected currents corresponding to said other modulating frequencies for steering said object in a vertical plane and in a vertical plane normal thereto, whereby the selection of said desired modulating frequency at said transmitter causes said object to move in a predetermined direction.

7. In a system for controlling the flight of a falling object, a transmitter located at a control point and a receiver located on said object, said transmitter including a pair of crossed horizontal dipole antennas for radiating a pair of radio frequency fields, means for producing modulations in one of said fields as a first modulating frequency, means for producing modulations in the other of said fields at a second modulating frequency, and means for simultaneously producing modulations in both of said fields at a desired one of a plurality of other modulating frequencies, and said receiver including a horizontally positioned dipole antenna mounted on said object and coupled to said receiver, means for rectifying currents induced in said antenna to obtain modulation frequency currents, frequency selective means for separating said modulation frequency currents into separate channels, a pair of differentially connected rudders, a differential relay responsive to changes in the relative amplitude of currents corresponding to said first and second modulation frequencies, means for rotating said rudders in accordance with the position of said relay, said rudders being adapted to rotate said object in a direction tending to oppose said changes, and means respectively responsive to currents corresponding to said other modulating frequencies for steering said object in a vertical plane and in a vertical plane normal thereto, whereby the selection of said desired modulating frequency at said transmitter causes said object to move in a predetermined direction.

WINFIELD R. KOCH.